Patented Nov. 1, 1932

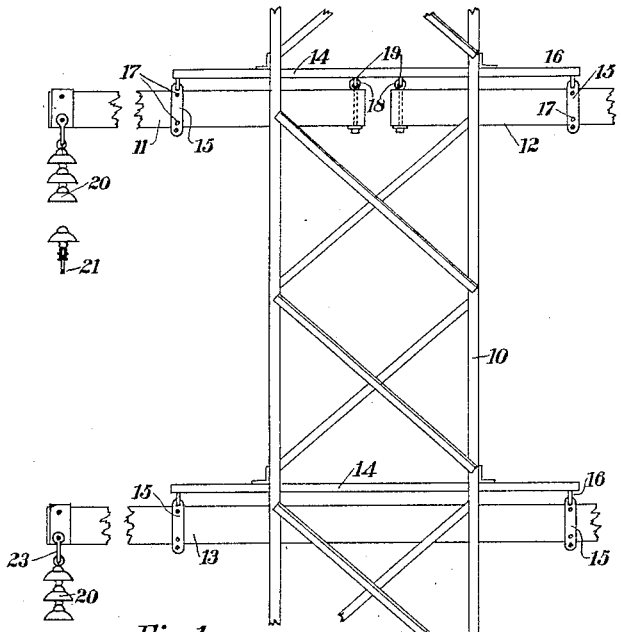
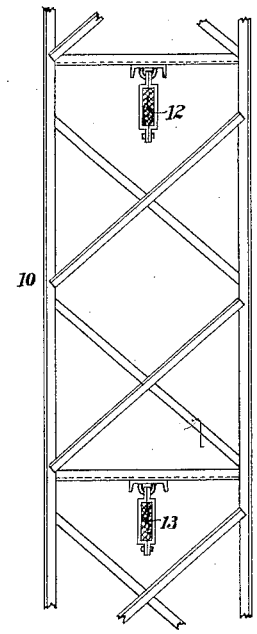
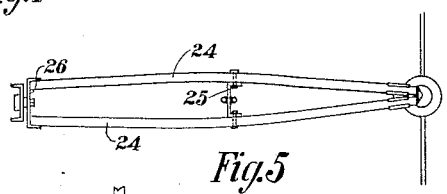
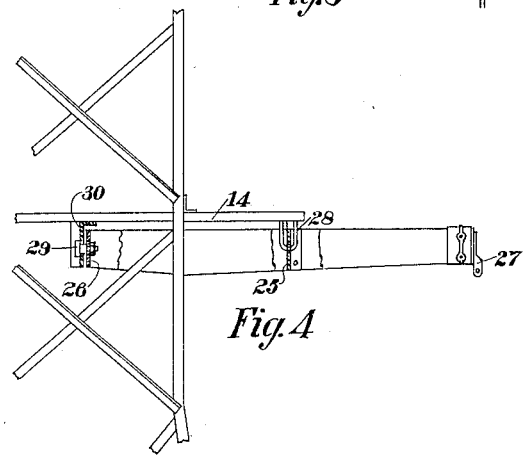
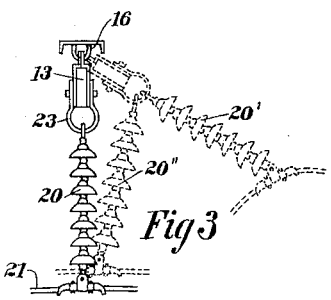

1,885,318

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE SUPPORT

Application filed October 2, 1929. Serial No. 396,821.

This invention relates to supports for transmission lines and has for one of its objects the provision of a transmission line support in which the supporting elements will automatically accommodate themselves to changes in the direction of the load to which they are subjected.

A further object of the invention is to provide a supporting tower having a cross arm pivotally mounted so that in case the supported line breaks at one side of the cross arm, the arm will be automatically tilted so as to offer its maximum resistance to the load as applied in a different direction due to the break in the conductor.

A further object of the invention is to provide a transmission line support which shall be of improved construction and operation.

Other objects and advantages will appear from the following description.

The invention is exemplified in the combination and arrangement of parts shown in the accompanying drawing and described in the following specification, and it is more particularly pointed out in the appended claims.

In the drawing:

Fig. 1 is a side elevation of a portion of a transmission line support having one embodiment of the present invention applied thereto.

Fig. 2 is an elevation looking toward the left in Fig. 1.

Fig. 3 is an end elevation of the lower cross arm looking toward the right in Fig. 1.

Fig. 4 is an elevation with parts broken away showing a modification of the invention.

Fig. 5 is a top plan of the cross arm of Fig. 4.

As pointed out in my prior application, Serial Number 112,746, filed June 1, 1926, it is frequently desirable in connection with metal towers to use wood cross arms for supporting the transmission lines. Since the load on these cross arms is normally vertical, a more economical distribution of the material of the cross arm is obtained by employing an arm which has greater strength vertically than horizontally in the direction of the line. Of course, this same observation applies to metal cross arms, and it will be understood that the present invention is applicable to both wood and metal arms, but is of a special utility in connection with wood arms, because a wood beam is more apt to be broken by a sudden application of abnormal force in the direction of the line than is a metal cross arm as usually constructed. A wood cross arm of much greater depth than thickness operates satisfactorily so long as the transmission line remains intact at both sides of the support, but if the line is broken from any cause at one side of the support, the cross arm is subjected to a heavy lateral force in the direction of the remaining portion of the transmission line, and since the arm, as ordinarily constructed, is not adapted to withstand this abnormal lateral force, there is danger that the arm may be broken off and the line permitted to fall. This difficulty is overcome in the present invention by pivotally supporting the arm to tilt about a horizontal axis so that when the line is broken at one side, the arm will be tilted by the force exerted by the unbroken conductor into a position to oppose its greatest transverse dimension to the new direction of the load on the arm.

In the drawing, the numeral 10 designates a skeleton tower of any approved form having cross arms 11, 12 and 13 mounted thereon. The cross arms 11 and 12 at the top of the tower may be supported by a beam or bar 14 or other suitable tower structure, from which the arms 11 and 12 are pivotally suspended, by interlinked members attached to the cross arms and beam 14, respectively. The interlinked members may comprise straps 15 bolted about the bars 11 and 12 or otherwise secured thereto, the upper ends of the straps being perforated to receive U-bolts 16, secured to the support 14, and projecting downwardly therefrom. By supporting the arms 11 in straps 15, the necessity of perforating the arms at points of greatest bending moment is avoided. Screws, nails or small bolts 17 may be passed through the straps 15 into the arms 11 to prevent relative creeping of the straps on the arms. The holding members 17 are usually not essential where the straps are tightly bolted about the cross arms. Eye-bolts 18 may be passed through the inner ends of the arms 11 and 12 and secured to U-bolts 19 on the supporting structure. Insulator strings 20 are suspended from the cross arms in the usual or any approved manner and support the conductors 21. The lower cross arm 13 is shown as extending entirely through the supporting structure 10 so as to support conductors at both sides of the tower. With a construction of this kind, the entire cross arm may be supported by the straps 15, as eye-bolts at the center of the tower will not be required. The insulators 20 are shown suspended from a clevis 23 so as to permit lateral swinging of the insulator string.

In Fig. 3 there is shown at 20′ the position the insulator string will take when the line 21 breaks at one side of the string. It will be noted that the cross arm 13 swings about its pivotal support 16 so that the greatest transverse strength of the cross arm 13 is arranged in the direction of the force of the load on the insulator string 20. If the cross arm is continuous from one side of the tower to the other, the entire cross arm will, of course, be tilted so that the insulator string at the end of the arm opposite that supporting the broken conductor will take the position shown at 20″. The clevis 23 permits the insulator string at the side of the tower having the unbroken line to remain approximately in its original position so that the unbroken line is but slightly disturbed. Where two arms are employed, as shown at 11 and 12, failure of the line at either side of the tower will have no effect upon the support of the line at the other side.

In the form of the invention shown in Figs. 4 and 5, the cross arm is made up of spaced wooden beams 24, connected by metal bracing and tie members 25 and 26. The insulator string is suspended from a fitting 27 at the end of the insulator. A U-bolt 28 passes through an opening in the plate 25 located approximately on the central, horizontal axis of the cross arm. A pin 29 is secured to the tie plate 26 and is pivoted in a plate 30 carried by the bracket arm 14. With this form of mounting, it is apparent that the cross arm is pivoted to rotate about its central, horizontal axis so that it may shift its angular position to oppose its greatest bending moment to changing directions of the force on the insulator string without materially shifting the center of mass of the cross arm.

It will be apparent that many changes in details of construction may be made without departing from the spirit and scope of the invention as defined in the appended claims.

I claim:

1. In combination a supporting structure, a rigid cross arm comprising a beam having greater strength against vertical than against lateral bending movement, a portion of said beam projecting beyond said supporting structure a distance several times the vertical height of said beam, said projecting portion being sustained entirely by its own rigidity, means for pivotally supporting said cross arm to rotate about an axis extending longitudinally of the cross arm, and a transmission line supported on said cross arm and attached to said cross arm at a point below the pivotal axis of said cross arm.

2. In combination a supporting structure, a rigid cross arm comprising a beam mounted on said structure and having a greater strength vertically than horizontally, a portion of said beam projecting beyond said supporting structure a distance several times the vertical height of said beam, said projecting portion being sustained entirely by its own rigidity, means for supporting said cross arm to swing upon a fixed horizontal axis extending longitudinally of said cross arm and a load attached to said cross arm at a point below the pivotal axis of said cross arm.

3. A support for a transmission line comprising a supporting structure, a rigid cross arm for said structure, a line mounted on said cross arm, said cross arm comprising a beam arranged with the plane in which it offers greatest resistance to bending extending substantially in alinement with the force of the load on said cross arm a portion of said beam projecting beyond said supporting structure a distance several times the vertical height of said beam, said projecting portion being sustained entirely by its own rigidity, said arm being pivotally mounted to swing about an axis extending longitudinally of said arm to maintain said plane in alinement with the load on said arm when the direction of said load changes said load being suspended from a point on said cross arm below the pivotal axis of said arm.

4. In combination a supporting structure, a rigid cross arm comprising a beam mounted on said structure and having the plane of its greatest resistance to bending substantially vertical, a portion of said beam projecting beyond said supporting structure a distance several times the vertical height of said beam, said projecting portion being sustained entirely by its own rigidity, said cross arm being pivoted to swing about a longitudinal axis to vary the angular position of said plane, an insulator suspended from a point on said cross arm below the said axis and a transmission line carried by said insulator.

5. In combination a supporting structure, a cross arm pivotally suspended from said structure to tilt about an axis extending longitudinally of said cross arm, an insulator suspended from said cross arm, a conductor carried by said insulator, and a U-shaped clevis for attaching said insulator to said cross arm to permit said insulator to assume various angular positions relative to said cross arm and a cross arm supporting clevis engaging said cross arm between the upper and lower faces thereof to provide a pivotal axis for said cross arm disposed between the upper and lower surfaces of said arm.

6. In combination a transmission tower, a cross arm for said tower comprising a wood beam of greater resistance to transverse bending in one direction than another and having the end thereof projecting beyond its support a distance greater than the maximum vertical dimension of said beam, attaching members secured at longitudinally spaced points along said beam, supports interlinked with said attaching members for pivotally suspending said beam with its greatest resistance to bending moment arranged in a vertical plane, an insulator string suspended from said beam, and a transmission line carried by said insulator string.

7. A transmission line support comprising a cross arm, an insulator mounted on said cross arm, and means for suspending said cross arm for pivotal movement about a fixed axis extending longitudinally of, and substantially through the center of gravity of said cross arm.

8. A transmission line support comprising a rigid cross arm, and a pintle disposed at one end of said cross arm between the upper and lower surfaces thereof for supporting said cross arm about a longitudinal axis below the upper and lower surfaces of said cross arm.

9. A transmission line support comprising a cross arm formed of spaced bars, a web connecting said bars, and a support for said cross arm having pivotal connection with said web between the upper and lower surfaces of said cross arm.

In testimony whereof I have signed my name to this specification this 30th day of September A. D. 1929.

ARTHUR O. AUSTIN.